US012752282B2

(12) United States Patent
Leppert et al.

(10) Patent No.: US 12,752,282 B2
(45) Date of Patent: Oct. 6, 2026

(54) MEAT GRINDER WITH FUNNELED FEED CHUTE

(71) Applicant: Hamilton Beach Brands, Inc., Glen Allen, VA (US)

(72) Inventors: Kevin L Leppert, Lanexa, VA (US); Ernest B Pryor, Jr., Maidens, VA (US); Michael G Sandford, Mechanicsville, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 221 days.

(21) Appl. No.: 18/771,781

(22) Filed: Jul. 12, 2024

(65) Prior Publication Data

US 2024/0390913 A1 Nov. 28, 2024

Related U.S. Application Data

(62) Division of application No. 17/374,649, filed on Jul. 13, 2021, now Pat. No. 12,042,798.

(60) Provisional application No. 63/051,458, filed on Jul. 14, 2020.

(51) Int. Cl.
*B02C 18/22* (2006.01)
*A22C 17/00* (2006.01)
*B02C 18/30* (2006.01)

(52) U.S. Cl.
CPC ...... *B02C 18/2291* (2013.01); *A22C 17/0026* (2013.01); *B02C 18/302* (2013.01); *B02C 18/305* (2013.01)

(58) Field of Classification Search
CPC ... B02C 18/2291; B02C 18/30; B02C 18/301; A22C 17/0026
See application file for complete search history.

(56) References Cited

U.S. PATENT DOCUMENTS 2,655,967 A * 10/1953 Mallory .................. B02C 18/30 403/18
3,014,515 A * 12/1961 Meeker ..................... F16P 3/08 241/37.5

(Continued)

FOREIGN PATENT DOCUMENTS

CN 104289293 A * 1/2015 ........... B02C 18/301

OTHER PUBLICATIONS

Translation of CN-104289293.*

*Primary Examiner* — Bobby Yeonjin Kim
(74) *Attorney, Agent, or Firm* — Alexander D. Raring

(57) ABSTRACT

A meat grinder includes: a housing; a drive unit mounted in the housing, the drive unit including a motor; a screw conveyor comprising a barrel fixed relative to the housing, and an auger located within the barrel and operatively connected with the motor; a hollow feed chute having upper and lower ends, the lower end mounted on and configured to feed into the barrel; and a feed tray mounted on the upper end of the feed chute, the feed tray including an opening in communication with the upper end of the feed chute. The feed chute includes an inlet section of a first inner diameter that includes the upper end, a feed section of a second inner diameter that includes the lower end, the second diameter being less than the first diameter, and a funneled section between the inlet section and the feed section.

6 Claims, 8 Drawing Sheets

(56) References Cited

U.S. PATENT DOCUMENTS

| | | | | |
|---|---|---|---|---|
| 2017/0274385 | A1* | 9/2017 | Moore | ................ B02C 18/2233 |
| 2018/0099289 | A1* | 4/2018 | Moore | ................ B02C 18/2291 |

* cited by examiner

MEAT GRINDER WITH FUNNELED FEED CHUTE

RELATED APPLICATION

The present application claims priority from U.S. patent application Ser. No. 17/374,649, filed Jul. 13, 2021, which in turn claim priority from and benefit of U.S. Provisional Patent Application No. 63/051,458, filed Jul. 14, 2020, the disclosures of which is hereby incorporated herein by reference in full.

FIELD OF THE INVENTION

The present disclosure relates generally to appliances for food processing, and more particularly to food grinders and accessories therefor.

BACKGROUND

A food grinder is an appliance that reduces cooked or raw meat or other foods from large pieces. They are used for sausage production, grinding beef or game into ground patties, and the like. A food grinder typically comprises a vertical food chute and horizontal screw conveyor unit. A feeding tray (also termed a hopper tray) is coupled to the upper end of the food chute. Food to be ground may be placed on the feeding tray and directed toward a hole (not illustrated) that leads to the food chute. The food to be ground travels down the food chute and into the barrel of the screw conveyor. A rotatable auger is positioned in the screw conveyor unit and has a shaft that engages with a motor. A rotating blade is located on the other end of the auger shaft. A disk or plate with a plurality of holes (different disks are typically available with different sizes holes) is placed on the outer end of the auger shaft. In use, the motor rotates the auger and the blade. The food that is pushed down into the food chute is conveyed by the rotating auger toward and past the blade, which grinds the food, and out through the disk.

It may be desirable to provide a meat grinder that can process meat and other foodstuffs more quickly.

SUMMARY

As a first aspect, embodiments of the invention are directed to a meat grinder. The meat grinder comprises: a housing; a drive unit mounted in the housing, the drive unit including a motor; a screw conveyor comprising a barrel fixed relative to the housing and an auger located within the barrel and operatively connected with the motor; a hollow feed chute having upper and lower ends, the lower end mounted on and configured to feed into the barrel; and a feed tray mounted on the upper end of the feed chute, the feed tray including an opening in communication with the upper end of the feed chute. The feed chute includes an inlet section of a first inner diameter that includes the upper end, a feed section of a second inner diameter that includes the lower end, the second diameter being less than the first diameter, and a funneled section between the inlet section and the feed section, the funneled section providing a gradual transition between the first and second inner diameters of the inlet section and the feed section.

As a second aspect, embodiments of the invention are directed to a meat grinder comprising: a housing; a drive unit mounted in the housing, the drive unit including a motor; a screw conveyor comprising a barrel fixed relative to the housing, and an auger located within the barrel and operatively connected with the motor; a hollow feed chute having upper and lower ends, the lower end mounted on and configured to feed into the barrel; and a feed tray mounted on the upper end of the feed chute, the feed tray including an opening in communication with the upper end of the feed chute. The feed chute includes an inlet section of a first inner diameter that includes the upper end, a feed section of a second inner diameter that includes the lower end, the second diameter being less than the first diameter, and a funneled section between the inlet section and the feed section, the funneled section having a cone angle of between about 5 and 75 degrees relative to a longitudinal axis of the feed chute.

As a third aspect, embodiments of the invention are directed to a meat grinder comprising: a housing; a motor mounted in the housing, the drive unit including a motor; a screw conveyor comprising a barrel fixed relative to the housing, and an auger located within the barrel and operatively connected with the motor; a hollow feed chute having upper and lower ends, the lower end mounted on and configured to feed into the barrel; a feed tray mounted on the upper end of the feed chute, the feed tray including an opening in communication with the upper end of the feed chute; and a tray support to support the feed tray from underneath. The tray support is mounted to the feed tray and to one of the housing and the screw conveyor.

DETAILED DESCRIPTION

Figure 1:
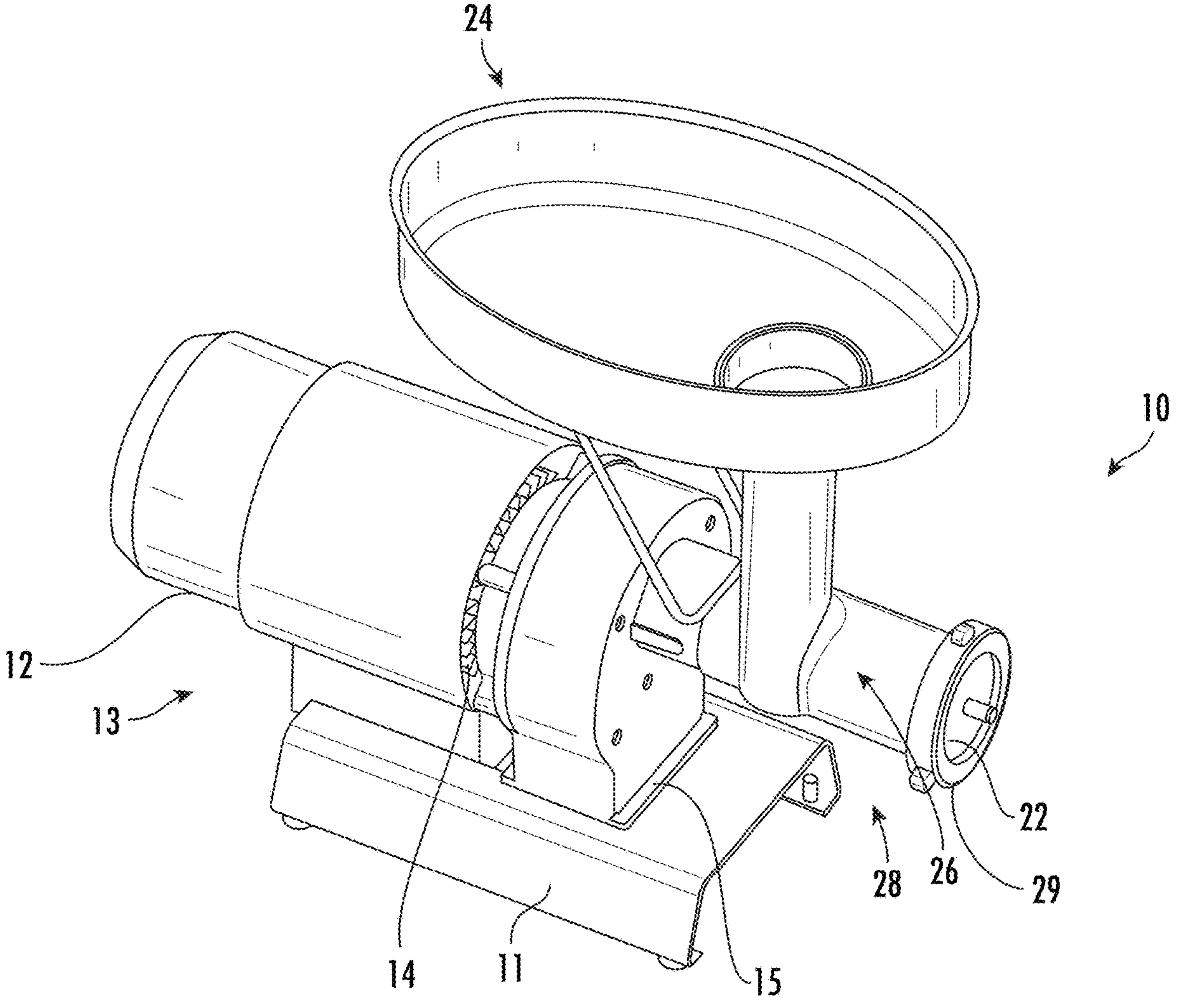
FIG. 1 is a perspective view of a meat grinder according to embodiments of the invention.

The present invention is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

It will also be understood that, as used herein, the terms "example," "exemplary," and derivatives thereof are intended to refer to non-limiting examples and/or variants embodiments discussed herein, and are not intended to indicate preference for one or more embodiments discussed herein compared to one or more other embodiments.

Referring now to the drawings, a meat grinder according to embodiments of the invention is shown in FIGS. 1-7 and designated broadly at 10. The meat grinder 10 includes a base 11 below a housing 12 that houses a motor 14. A gearbox 15 is connected to the motor 14 and is configured to modify the speed and output torque of the motor 14 to desired levels. Together, the motor 14 and gearbox 15 form a drive unit 13, although in some embodiments the drive unit 13 may take different forms (e.g., the gearbox 15 may be omitted). The base 11, housing 12, motor 14 and gearbox 15 are of conventional construction and need not be described in detail herein. It is also contemplated that the housing 12 may be formed of multiple pieces (e.g., the term "housing" is intended to include both coverings that surround the motor 14 and the gearbox 15).

Figure 2:
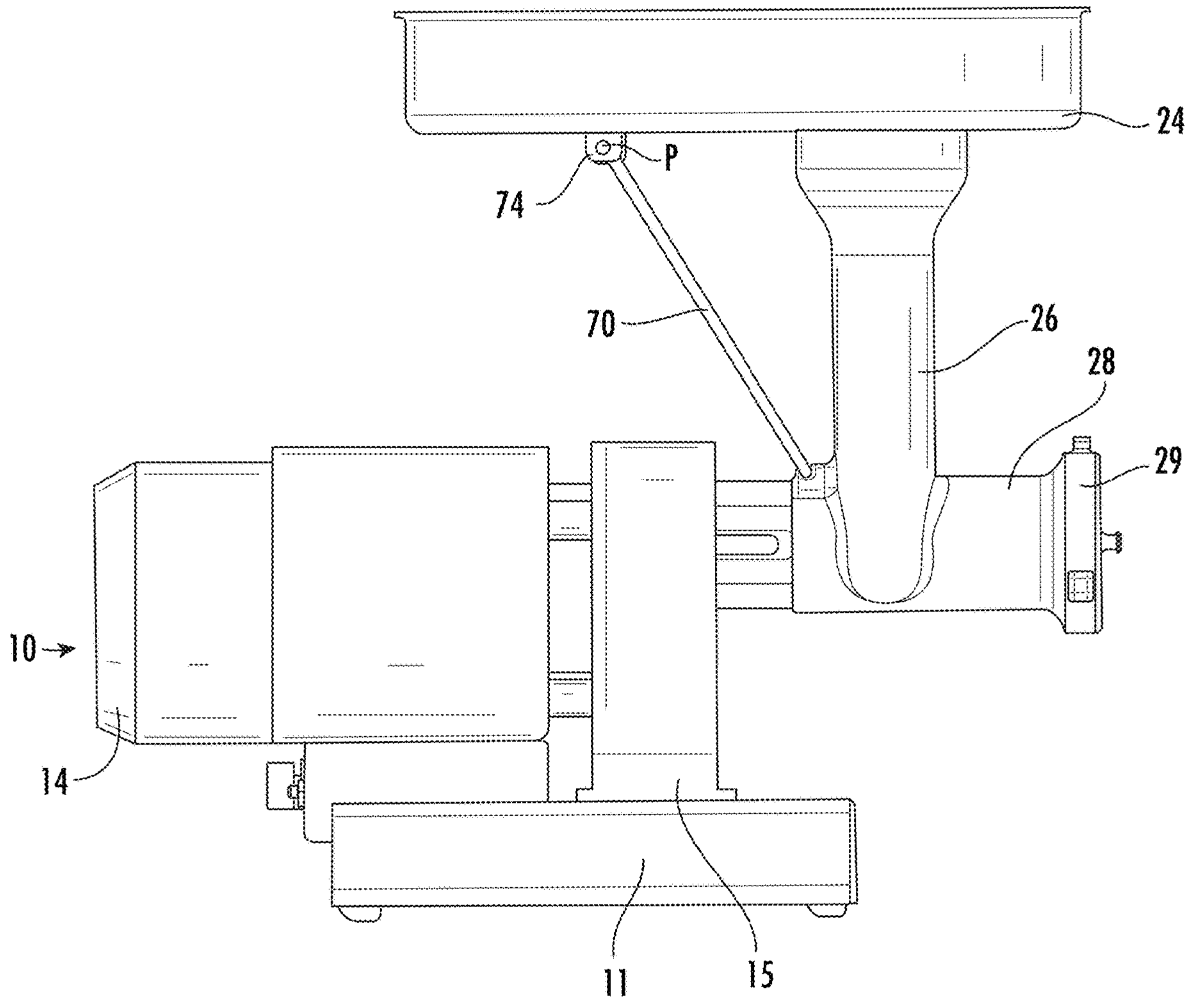
FIG. 2 is a front view of the meat grinder of FIG. 1.

Referring to FIGS. 1 and 2, the meat grinder 10 also includes a feed tray 24, a feed chute 26, and a horizontal screw conveyor 28. The screw conveyor 28 has an auger 20 (shown schematically in FIG. 6) that is coupled with the motor 14 through the gearbox 15 in conventional fashion. A perforated disk 22 is mounted on the free end of the screw conveyor 18 via a threaded cap 29.

Referring now to FIGS. 3-7, the feed tray 24, feed chute 26 and screw conveyor 28 are shown therein. The feed tray 24 (best seen in FIG. 4) has a generally flat floor 30 and a raised lip 32 that together form a pan or basin. The feed tray 24 is generally oval. A slotted lip 35 depends from the floor 30 and encircles an entry opening 36 that leads to the feed chute 26. The lip 35 and entry opening 36 are eccentrically positioned on the floor 30 toward one of the long ends of the oval.

Figure 5:
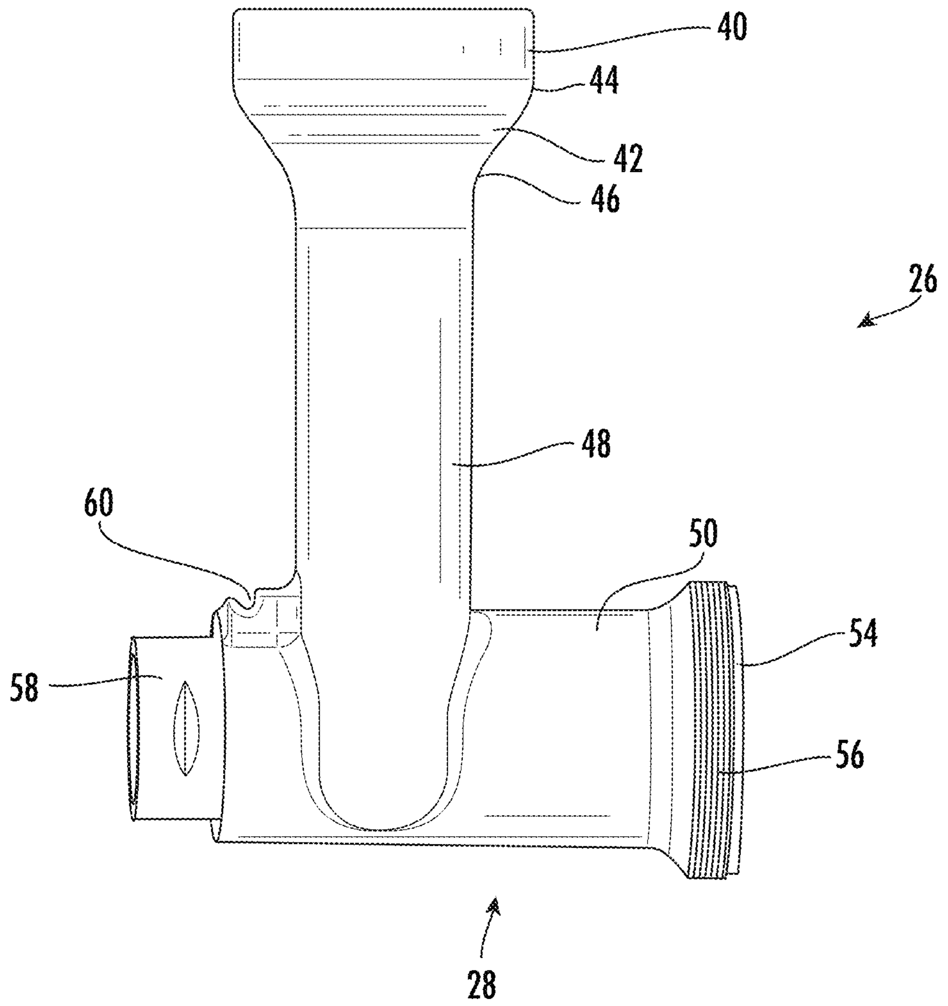
FIG. 5 is a front view of the feed chute and screw conveyor of the meat grinder of FIG. 1.
Figure 6:
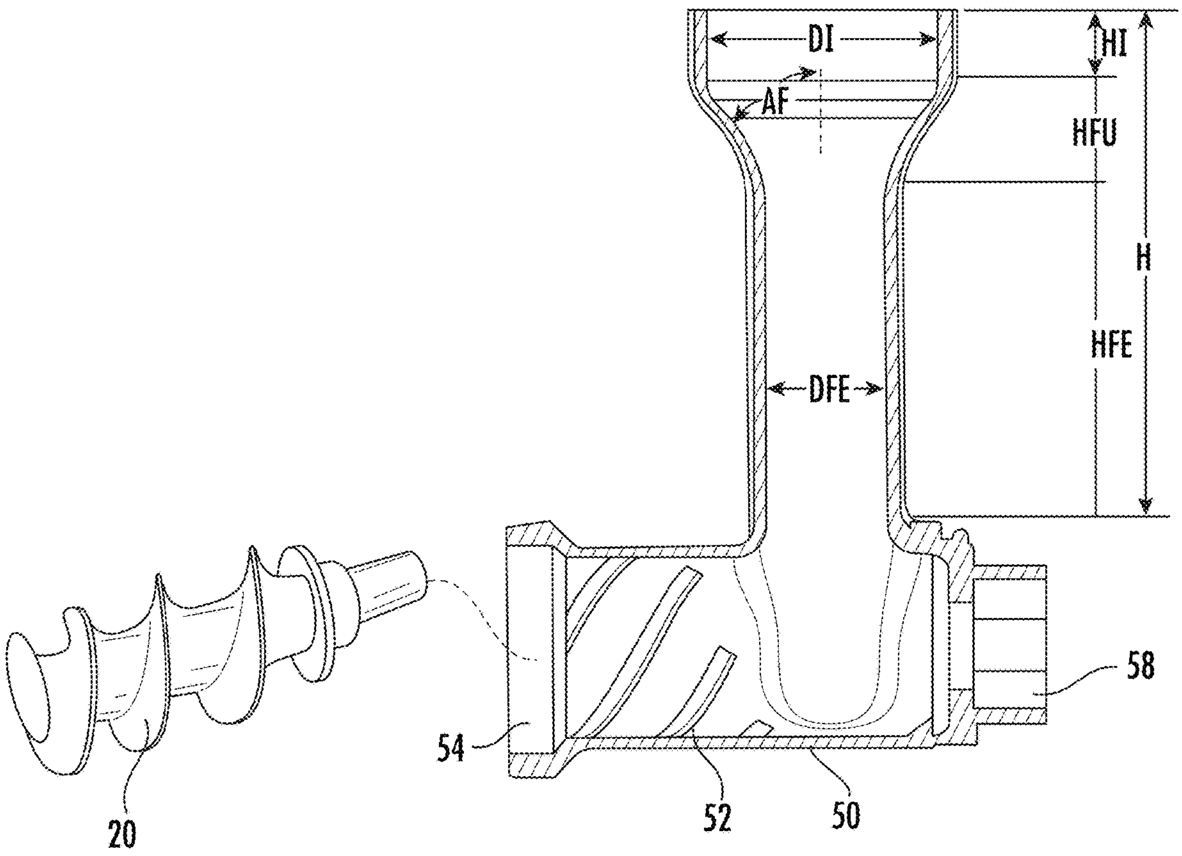
FIG. 6 is a front section view of the feed chute and screw conveyor of FIG. 6, with the auger shown exploded away from the barrel of the screw conveyor.

Referring to FIGS. 5 and 6, the feed chute 26 includes a generally cylindrical inlet section 40 that abuts the underside of the floor 30 beneath the entry opening 36 and removably receives the lip 35 of the feed tray 24. A funnel section 42 merges with and is positioned beneath the inlet section 40. The funnel section 42, which has a wider upper end 44 and a narrower lower end 46, provides a smooth, gradual transition surface between the inlet section 40 and a lower feed section 48. The feed section 48 is generally cylindrical and extends between the lower end 46 of the funnel section 42 and the screw conveyor 28.

In some embodiments, the feed chute 26 has an overall height H that is between about 3.75 and 13 inches (e.g., between about 6 and 10 inches). More specifically, the inlet section 40 may have a height HI between about 0.25 and 2 inches (e.g., between about 0.75 and 2 inches), the funnel section 42 may have a height HFU between about 0.5 and 5 inches (e.g., between about 1 and 3 inches), and/or the feed section 48 may have a height HFE between about 3 and 6 inches (e.g., between about 4 and 5.5 inches). In some embodiments, the inlet section 40 may have a diameter DI of between about 2.5 and 5 inches (e.g., between about 3 and 4 inches), and/or the feed section 48 may have a diameter DFE of between about 1.5 and 3 inches (e.g., between about 1.75 and 2.5 inches). In some embodiments, the ratio DI/DFE may be between about 1.25 and 2.5 (e.g., between about 1.5 and 2). The funnel section 42 may have a "cone angle" AF relative to its longitudinal axis of between about 5 and 75 degrees between the upper end 44 and the lower end 46 (e.g., between about 30 and 45 degrees).

It is contemplated that the funnel section 42 may define a traditional cone, wherein in cross-section the walls of the funnel section 42 define a straight line, or the walls of the funnel section 42 may define an arc in cross-section and therefore have convexity (as in the case in the illustrated embodiment) or concavity relative to the upper and lower ends 44, 46.

Referring still to FIGS. 5 and 6, the screw conveyor 28 has a generally cylindrical barrel 50. The lower end of the feed chute 26 merges with and feeds into an intermediate section of the barrel 50. As can be seen in FIG. 6, the interior of the barrel 50 includes helical threads or ridges 52 that can assist in the conveyance of meat or other foodstuffs within the barrel 50 as the auger 20 rotates. The free end of the barrel 50 has an expanded lip 54 with threads 56. The cap 29 is threaded onto the lip 54 and secures the perforated disk 22 in place (see FIGS. 1 and 2). The opposite end of the barrel 50 has a coupling section 58 that is somewhat smaller in diameter than the remainder of the barrel 50 and is mounted onto the gearbox 15. A support notch 60 is located on the upper surface of the barrel 50 near the coupling section 58.

Figure 3:
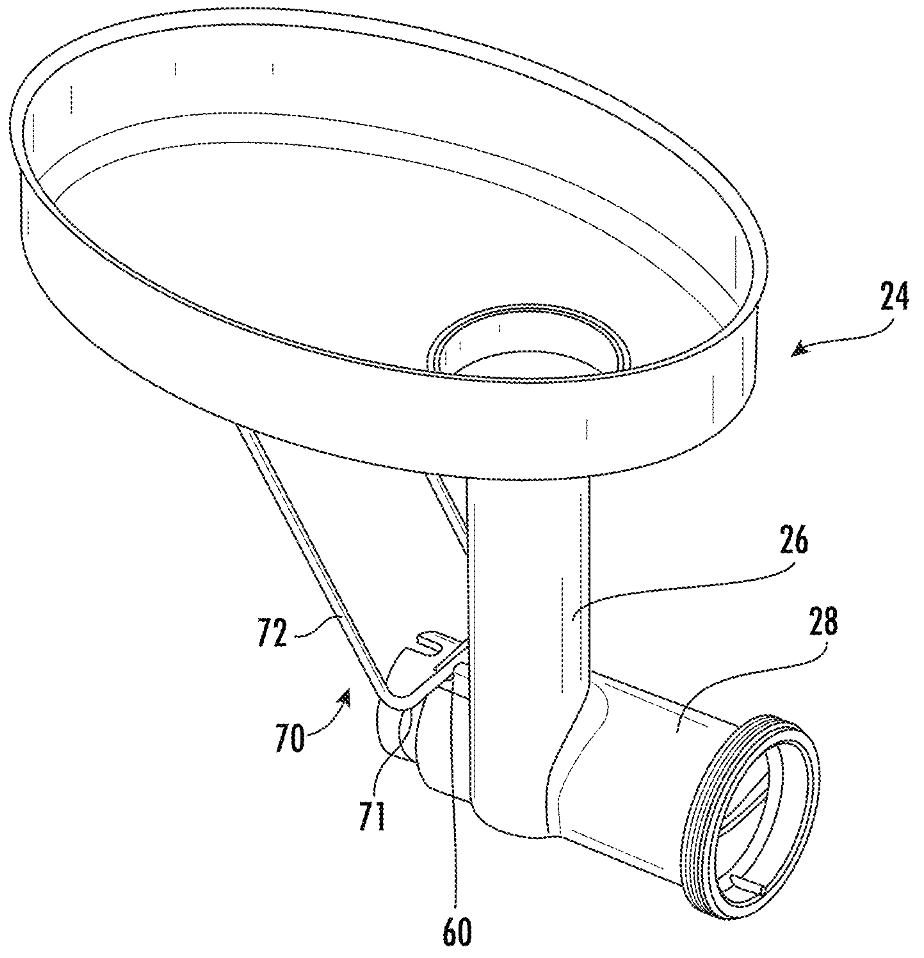
FIG. 3 is a perspective view of the feed tray, feed chute and screw conveyor of the meat grinder of FIG. 1.
Figure 4:
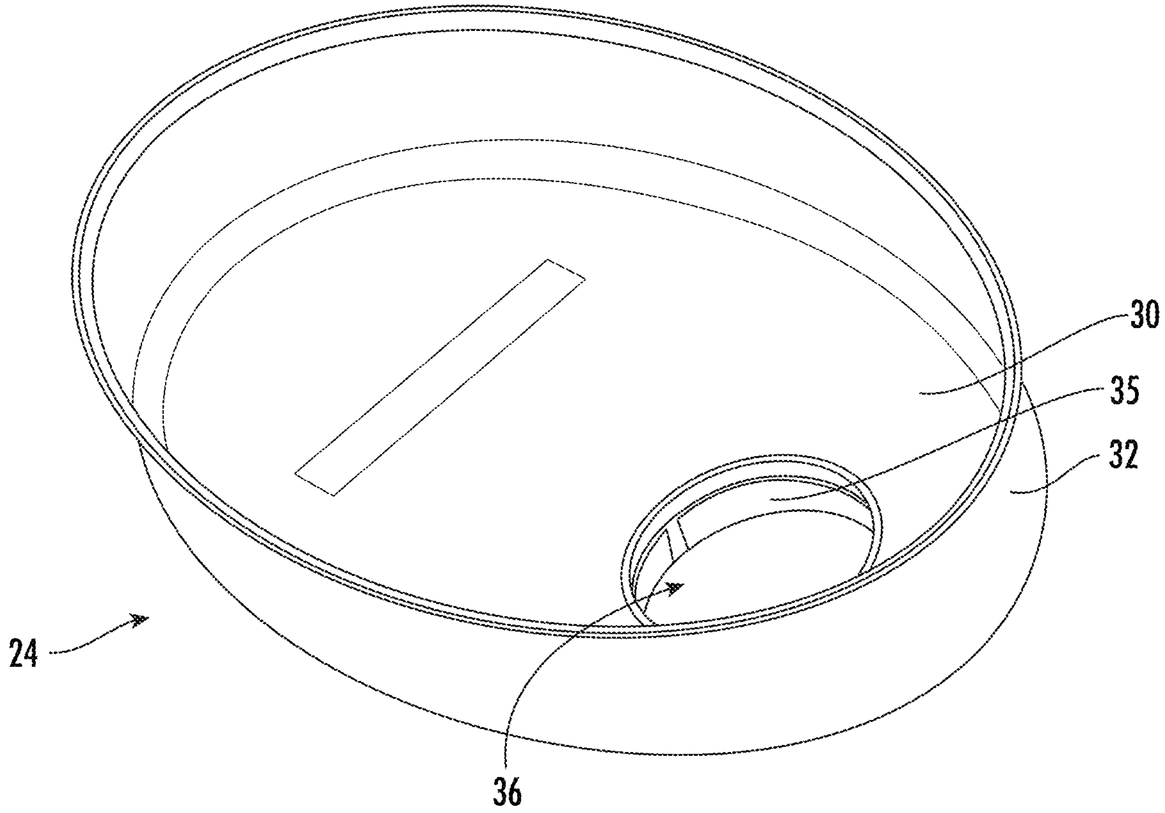
FIG. 4 is a perspective view of the feed tray of the meat grinder of FIG. 1.
Figure 7:
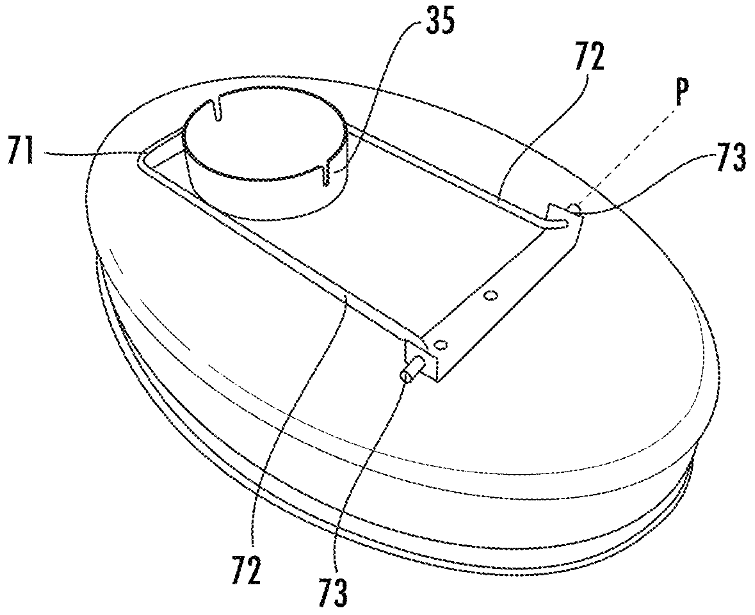
FIG. 7 is a bottom perspective view of the feed tray and tray support of the meat grinder of FIG. 1, with the tray support shown in a folded position.

Referring to FIGS. 2, 3 and 7, a tray support 70 shown therein is generally U-shaped, with a center section 71, arms 72, and short segments 73 at the ends of the arms 72. The short segments 73 are received in ears 74 that depend from the underside of the floor 30 of the feed tray 24. When the feed tray 24 is mounted on the feed chute 26, the center section 71 of the tray support 70 is received in the support notch 60. When the feed tray 24 is removed from the feed chute 26 (e.g., for cleaning or storage), the tray support 70 can pivot about an axis P defined by the short segments 73 and fold under the floor 30, with the lip 35 being located within the "U" defined by the tray support 70 (see FIG. 7).

The meat grinder 10 operates in a conventional manner. The feeding tray 24 is mounted on the upper end of the feed chute 26, with the lip 35 received within the inlet section 42 of the feed chute 26. The tray support 70 is pivoted about the axis P to a position in which the center section 71 is received in the support notch 60. The motor 14 is activated (typically with a binary "on-off" switch), which, through the connection with the gearbox 15, causes the auger 20 to rotate within the barrel 50. Meat (or another foodstuff) is then fed through the opening 36 in the feed tray 24 and into the feed chute 26. The meat descends through the feed chute 26 and enters the screw conveyor 28. Rotation of the auger 20 causes the meat to travel longitudinally within the barrel 50 toward the disk 22. As the meat reaches the disk 22, the action of the auger 20 forces the meat through the perforation holes in the disk 22, thereby grinding the meat as desired.

Notably, the configuration of the feed chute 26 can provide performance advantages to the meat grinder 10. First, the overall length of the feed chute 26 (represented by the height H) provides sufficient distance between the feed tray 24 (where the user's hands/fingers deposit the meat into the feed chute 26) and the auger 20 that the meat grinder 10 may be used without a safety guard (which is often present to prevent the user's fingers from potential interaction with the auger). The absence of the safety guard enables meat to be fed into the feed chute more rapidly.

In addition, the presence of the funneled section 44 can facilitate the feeding of meat into the feed chute 26. In prior meat grinders, the transition between the opening 36 in the feed tray 24 and the feed chute 26 typically had either a straight profile or a "stepped" profile, neither of which encouraged the feeding of meat into the feed chute 26. The presence of the funneled section 44 can enable smooth feeding of meat that can increase feeding speed.

Figure 8:
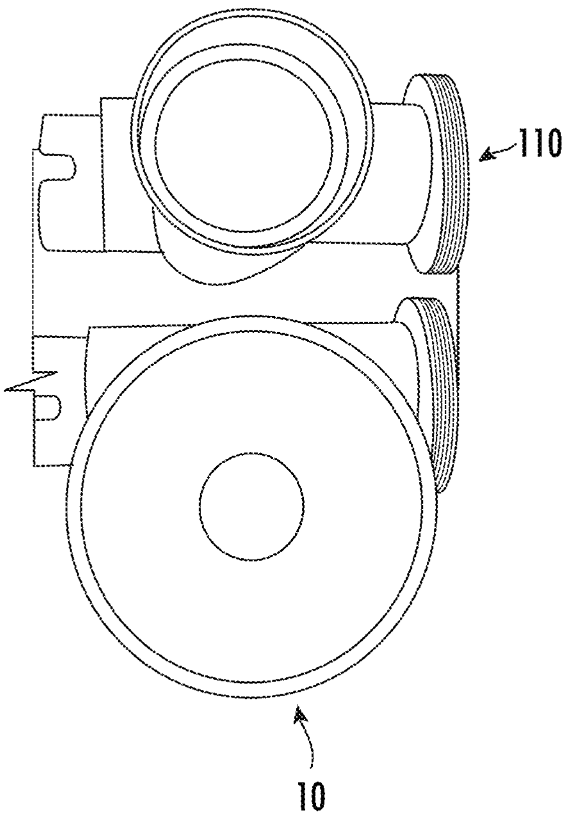
FIG. 8 is a top view of the feed chute of the meat grinder of FIG. 1 compared to a prior feed chute.
Figure 9:
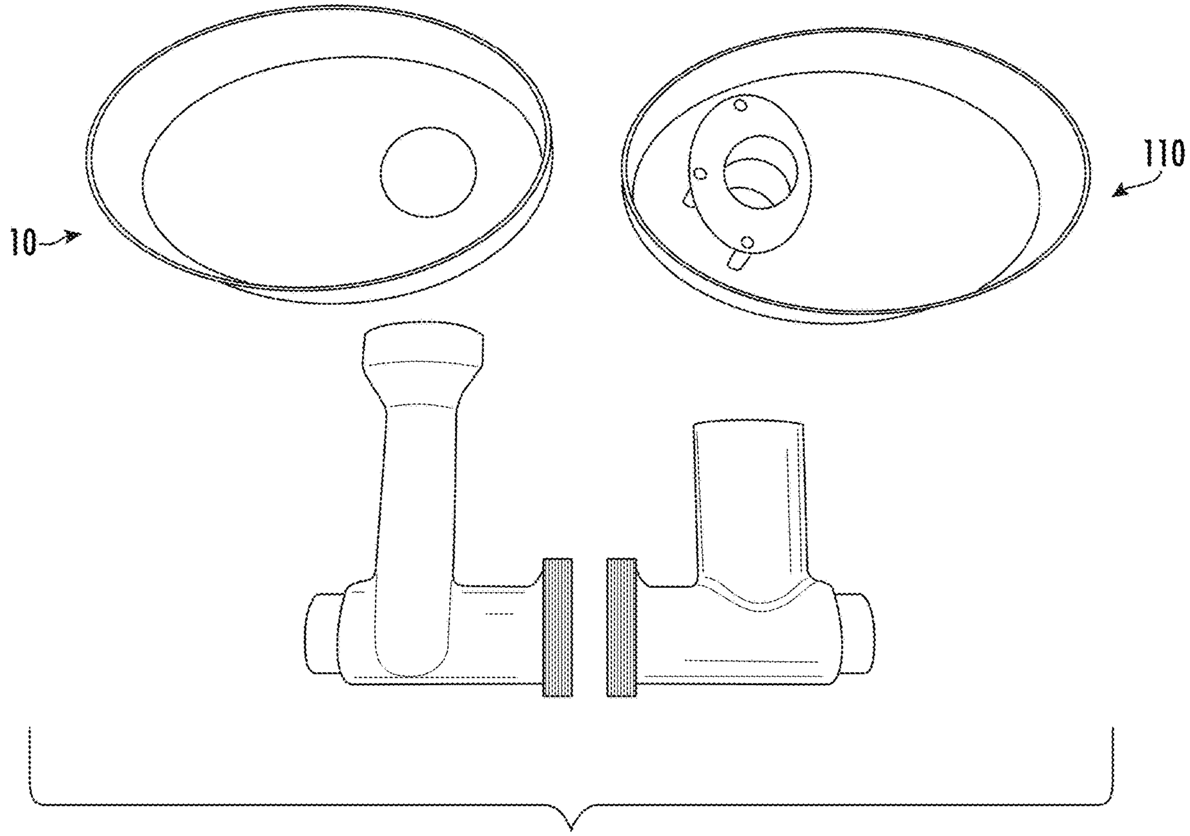
FIG. 9 is an exploded view of the feed tray, feed chute and screw conveyor of the meat grinder of FIG. 1 compared to those of a prior meat grinder.

As an example, a meat grinder that utilizes the configuration of the food tray 24 and feed chute 26 shown in FIGS. 3-6 was compared to a prior model 110 that included a safety guard and had a "stepped" feed chute and safety guard (see FIGS. 8 and 9). Key dimensions for each design are shown in Table 1 below.

TABLE 1

| | Meat grinder 10 | Meat grinder 110 |
|---|---|---|
| Overall height | 8 in | 5 in |
| Inlet diameter | 3.4 in | 2.5 in |
| Exit diameter | 2 in | 2.5 in |
| Profile transition | Funnel with 37 degree cone angle | Stepped |
| Output | 14 lb/min | 12 lb/min |

Even though the prior model meat grinder 110 had a shorter feed chute length and a wider feed chute over most of its length, the meat grinder 10 described above and shown in FIGS. 8 and 9 was able to receive and grind meat deposited therein at a higher rate (approximately 15 percent higher).

Also noteworthy is the presence of the tray support 70. In prior designs, such as the meat grinder 110, the feed tray was positioned only slightly above the motor housing because the feed chute was relatively short. Thus, if the feed tray tipped slightly under the weight of meat therein, the housing was present to provide support for the feed tray from underneath. However, the longer feed chute 26 of the meat grinder 10 can position the feed tray 24 well above the housing 14, so the housing 14 is not positioned to provide support if the feed tray 24 tips. Thus, the tray support 70 can provide stability to the feed tray 24 should it be needed.

The invention being thus described, it will be apparent that the same may be varied in many ways. Such variations are not to be regarded as a departure from the spirit and scope of the invention, and all such modifications as would be obvious to one skilled in the art are to be included within the scope of the following claims.

That which is claimed is:

1. A meat grinder, comprising:
- a housing;
- a drive unit mounted in the housing, the drive unit including a motor;
- a screw conveyor comprising a barrel fixed relative to the housing, and an auger located within the barrel and operatively connected with the motor;
- a hollow feed chute having upper and lower ends, the lower end mounted on and configured to feed into the barrel; and
- a feed tray mounted on the upper end of the feed chute, the feed tray including an opening in communication with the upper end of the feed chute;
- wherein the feed chute includes a cylindrical inlet section of a first inner diameter that includes the upper end, a cylindrical feed section of a second inner diameter that includes the lower end, the second diameter being less than the first diameter, and a funneled section between the inlet section and the feed section, the funneled section having a cone angle of between about 5 and 75 degrees relative to a longitudinal axis of the feed chute.

2. The meat grinder of claim 1, wherein the ratio of the first diameter to the second diameter is between about 1.25 and 2.5.

3. The meat grinder of claim 1, wherein the feed chute has a length of between about 3.75 and 13 inches.

4. The meat grinder of claim 1, wherein the feed tray includes a lip that is received in the inlet section of the feed chute.

5. The meat grinder of claim 1, wherein the drive unit further comprises a gearbox that connects the motor to the auger.

6. The meat grinder of claim 1, wherein the feed tray lacks a safety guard associated with the opening.

* * * * *